(12) United States Patent
Nakaminami et al.

(10) Patent No.: US 6,371,899 B1
(45) Date of Patent: Apr. 16, 2002

(54) TOOL CHANGER FOR MACHINE TOOLS

(75) Inventors: Masamitsu Nakaminami; Masahiro Naito, both of Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/584,186

(22) Filed: May 31, 2000

(30) Foreign Application Priority Data

Jun. 1, 1999 (JP) ............................................ 11-153570

(51) Int. Cl.$^7$ ................................................ B23Q 3/157
(52) U.S. Cl. ............................ 483/41; 483/40; 483/49; 483/51
(58) Field of Search ............................... 483/41, 42, 22, 483/24, 37, 53, 40, 51, 49, 44, 38, 39

(56) References Cited

U.S. PATENT DOCUMENTS

| | | | | |
|---|---|---|---|---|
| 3,161,951 A | * | 12/1964 | Anthony | .................... 483/53 X |
| 3,691,655 A | * | 9/1972 | Kurimoto | ..................... 483/41 |
| 4,196,506 A | * | 4/1980 | Reed | ......................... 483/53 X |
| 4,631,981 A | * | 12/1986 | Kato et al. | ..................... 483/37 |
| 5,797,825 A | * | 8/1998 | Murata et al. | ................. 483/53 |

FOREIGN PATENT DOCUMENTS

| | | | | |
|---|---|---|---|---|
| JP | 54-99280 | * | 4/1984 | .................... 483/41 |
| JP | 60-135154 | * | 7/1985 | .................... 483/41 |
| JP | 62-259739 | * | 11/1987 | .................... 483/41 |

* cited by examiner

Primary Examiner—William Briggs
(74) Attorney, Agent, or Firm—Smith Patent Office

(57) ABSTRACT

A tool changer for machine tools is capable of transferring a tool transfer pot with a stroke smaller than the transfer distance of the tool transfer pot. The tool changer for a combined machining lathe includes a tool magazine having a multiplicity of tools and serving for transferring and indexing a next-process tool to a specified tool takeout position. A tool transfer mechanism transfers the next-process tool positioned in the tool takeout position or the tool delivery position to a tool changing position. A tool changing mechanism changes a process-completed tool loaded on a tool post body with the next-process tool positioned in the tool changing position. The tool transfer mechanism comprises a transfer arm pivotally disposed between the tool delivery position and the tool changing position. A tool transfer pot is coupled to a front-end portion of the transfer arm and serves to support the next-process tool.

5 Claims, 9 Drawing Sheets

TOOL CHANGER FOR MACHINE TOOLS

BACKGROUND OF THE INVENTION

1. Field of the Invention

The present invention relates to a tool changer for machine tools. In particular, the tool changer is equipped with a tool transfer mechanism that transfers a next-process tool, which has been transferred to a specified tool takeout position by a tool magazine, between the tool takeout position and a tool changing position.

2. Discussion of the Related Art

In some tool changers, there is a distance between the tool changing position set near the tool spindle and the tool takeout position for the next-process tool, which is set to the tool magazine. In such a case, generally, the tool changer is equipped with a tool transfer mechanism for transferring the next-process tool from the tool takeout position to the tool changing position.

An example of such a tool transfer mechanism is a tool transfer mechanism having an air cylinder mechanism that moves back and forth over a range from the tool takeout position to the tool changing position. In this device, a piston rod of the air cylinder mechanism is equipped with a tool pot for holding the next-process tool. The tool pot is linearly transferred between the tool takeout position and the tool changing position by the piston rod.

However, this conventional tool transfer mechanism requires a large-scale air cylinder mechanism having a stroke equal to or larger than the transfer distance of the tool pot. This poses the problem of increased installation space.

SUMMARY OF THE INVENTION

The present invention has been accomplished in view of these and other problems. Therefore, an object of the invention is to provide a tool changer for machine tools that is capable of transferring the tool pot with a stroke smaller than the transfer distance of the tool pot.

In order to achieve the above and other objects, the present invention provides a tool changer for machine tools comprising: a tool magazine having a multiplicity of tools, the tool magazine transferring and indexing a next-process tool to a predetermined tool takeout position; a tool transfer mechanism for taking out and transferring the next-process tool positioned in the tool takeout position to a tool changing position; and a tool changing mechanism for changing a tool loaded on a tool post with the next-process tool positioned in the tool changing position. The tool transfer mechanism comprises a transfer arm pivotably disposed so as to have a front end portion of the transfer arm move between the tool takeout position and the tool changing position, a tool holding member coupled to the front end portion of the transfer arm, the tool holding member supporting the next-process tool; and a cylinder mechanism coupled to the transfer arm for driving the transfer arm.

In an embodiment, the present invention provides a tool changer for machine tools as described above, further comprising a tool transfer pot for holding one of the tools, the transfer pot having an engaging groove extending in a tangential direction, and the tool holding member having a guide pin that engages with the engaging groove to thereby position and support the tool transfer pot axially and circumferentially.

According to the tool changer of the present invention, the transfer arm is pivotably provided between the tool takeout position and the tool changing position. The tool holding member is provided at the front end portion of the transfer arm. The cylinder mechanism for pivotally driving the transfer arm is coupled to the transfer arm. Therefore, the tool holding member can be transferred from the tool takeout position to the tool changing position with a stroke smaller than the travel distance of the tool holding member. As a result, the cylinder mechanism can be downsized proportionally. Consequently, the installation space can be reduced.

In an embodiment, an engaging groove is formed in the tool transfer pot and the tool holding member is provided with the guide pin to engage with the engaging groove. Therefore, when holding the tool transfer pot by the tool holding member, the tool transfer pot can be positioned in the axial and circumferential directions with reliability. Moreover, the tool transfer pot can be transferred to the tool changing position with the proper orientation. Thus the positioning accuracy of the cutting tool can be ensured in loading the next-process tool onto the tool spindle.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

An embodiment of the present invention is described below with reference to the accompanying drawings.

Figure 1:
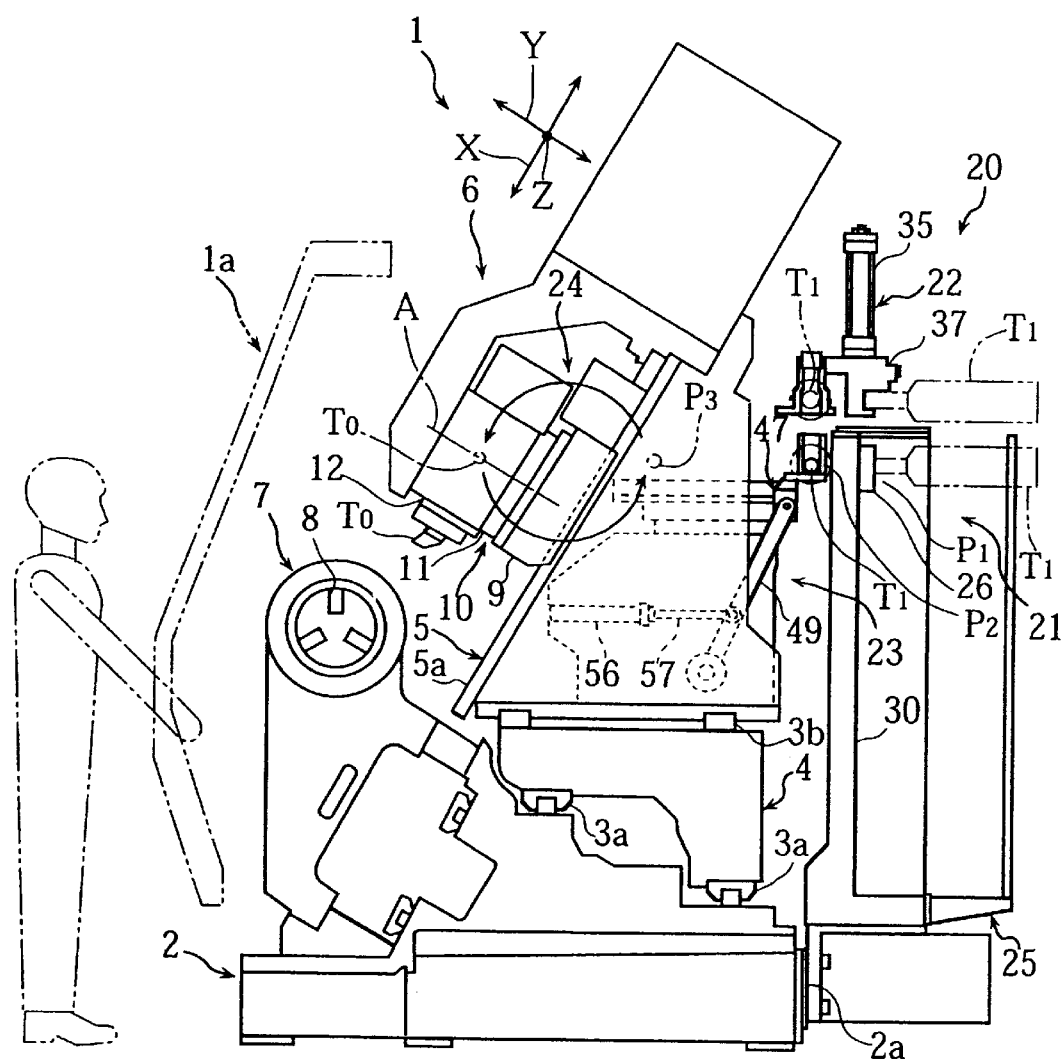
FIG. 1 is a right side view of a combined machining lathe equipped with the tool changer according to an embodiment of the present invention.
Figure 2:
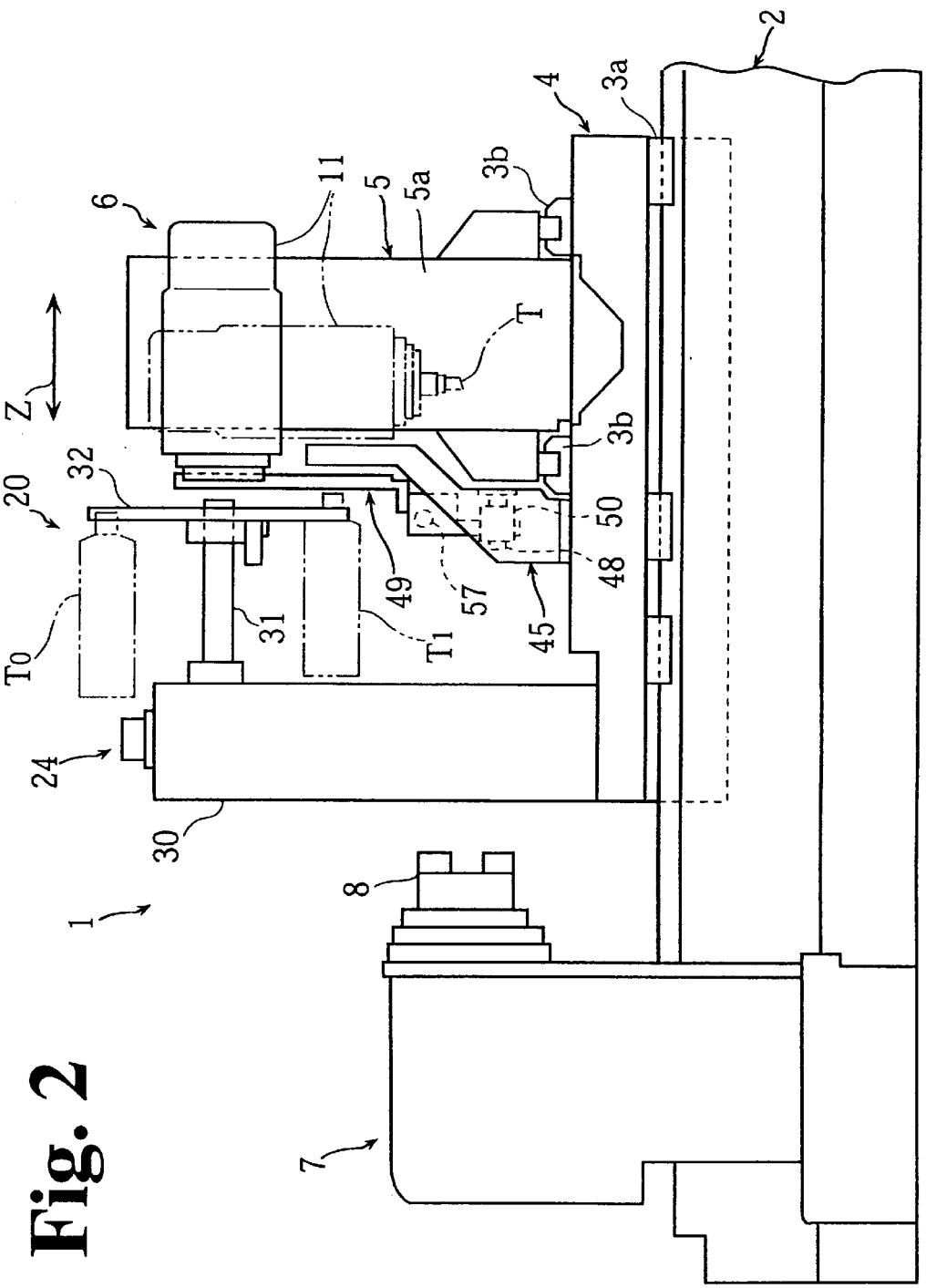
FIG. 2 is an enlarged partial front view of the combined machining lathe according to an embodiment of the present invention.
Figure 3:
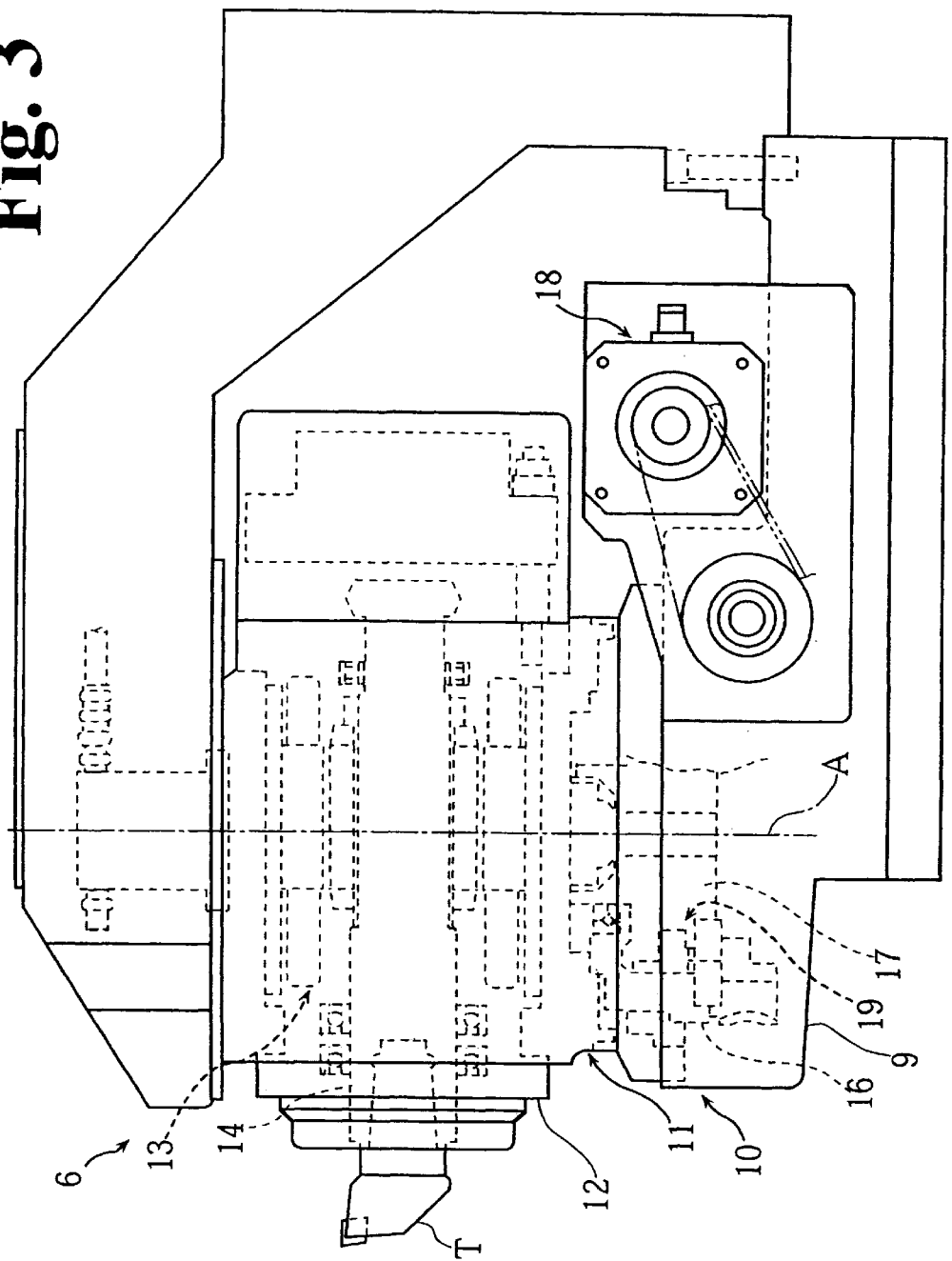
FIG. 3 is a right side view of the tool post of the combined machining lathe according to an embodiment of the present invention.

Referring to the figures, combined machining lathe 1 is capable of performing both turning and rotating-tool machining. On top of a fixed bed 2, a headstock 7 is fixedly disposed at a left side end portion as viewed from the front. A saddle 4 is disposed on the right side as viewed on the right side face so as to be movable in a Z-axis (a direction vertical to the sheet of FIG. 1) parallel to the axis of the headstock 7 via two linear guides 3a. A column 5 is disposed on top of the saddle 4 so as to be movable in a direction within a horizontal plane and perpendicular to the axis of the headstock 7 via two linear guides 3b. Moreover, a tool post 6 with a tool T fitted thereto is disposed on the column 5 so as to be movable within a plane along a sloping surface 5a of the column 5 and in an X-axis direction perpendicular to the axis of the headstock 7.

A main spindle (not shown) equipped with a chuck 8 for gripping a workpiece is provided on the headstock 7. This main spindle is rotationally driven by a spindle motor (not shown). In addition, a door 1a for opening and closing an access opening is formed in a cover (not shown).

Regarding the structure of the tool post 6, a support base 9 is disposed on the forwardly-declined sloping surface 5a of the column 5 so as to be slidable in the X-axis direction. Although it is not particularly limited, the slope angle shown in the figures is approximately 60 degrees. A tool post body 11 is supported on the support base 9 so as to be rotationally indexable and clampable about a turning axis A, so that the movement is perpendicular to the sloping surface 5a, by means of a rotational indexing device 10.

The tool post body 11 comprises a tool spindle 14 in which the tool T is removably fitted at its front end portion and a tool spindle head 12 for rotatably supporting the tool spindle 14. A tool spindle motor 13 is placed within the tool spindle head 12 and drives the rotation of the tool spindle 14.

The rotational indexing device 10 comprises a rotating table 16 fixedly bolted to the tool post body 11. A fixing table 17 is disposed within the rotating table 16 so as to be coaxial therewith and is fixedly bolted to the support base 9. The rotational indexing device 10 further comprises a rotation driving mechanism 18 for rotationally driving the rotating table 16 to a specified indexing angular position about the turning axis A. The rotational indexing device 10 also comprises a coupling mechanism 19 which fixes the rotating table 16 to the indexing angular position of the fixing table 17. With the tool post body 11 fixed in the indexing angular position, lathe turning or milling can be performed.

The combined machining lathe 1 has a tool exchanger 20. This tool exchanger 20, on which a multiplicity of tools T are loaded, comprises: a tool magazine 21 for transferring, indexing and positioning a next-process tool T1 in a tool takeout position P1; and a tool turning/transferring mechanism 22 for taking out the next-process tool T1 positioned to the tool takeout position P1 and turning and transferring it to a delivery position P2. The tool exchanger 20 further comprises: a tool transfer mechanism 23 for transferring the next-process tool T1, which has been transferred to the delivery position P2, to a tool changing position P3; and a tool changing mechanism 24 for replacing a process-completed tool T0 loaded on the tool spindle 14 with the next-process tool T1 transferred to the tool changing position P3. It is noted that during a tool change, the process-completed tool T0 is positioned in the changing position by turning the tool post body 11 in the direction vertical to the sheet of FIG. 1 about the turning axis A by the rotational indexing device 10.

The tool magazine 21 is located on the fixed bed 2 and behind or rearward of the tool post 6. The tool magazine 21 is supported by a magazine support base 25 fixedly bolted to a rear side wall 2a of the fixed bed 2. This tool magazine 21 is constructed so that a multiplicity of tool transfer pots 26 for holding the tool T1 on an endless transfer chain 21b wound around a driving sprocket 21a are removably attached at a specified pitch. The endless transfer chain 21b is driven by a turn driving motor (not shown). The tool takeout position P1 is set so as to be positioned on a line that connects the tool delivery position P2, the tool changing position P3 and the process-completed tool T0 indexed to the changing position, as viewed in FIG. 1. These positions P1 to P3 are set generally flush with one another. As a result, the transfer amount of the next-process tool T1 is reduced.

Figure 5:
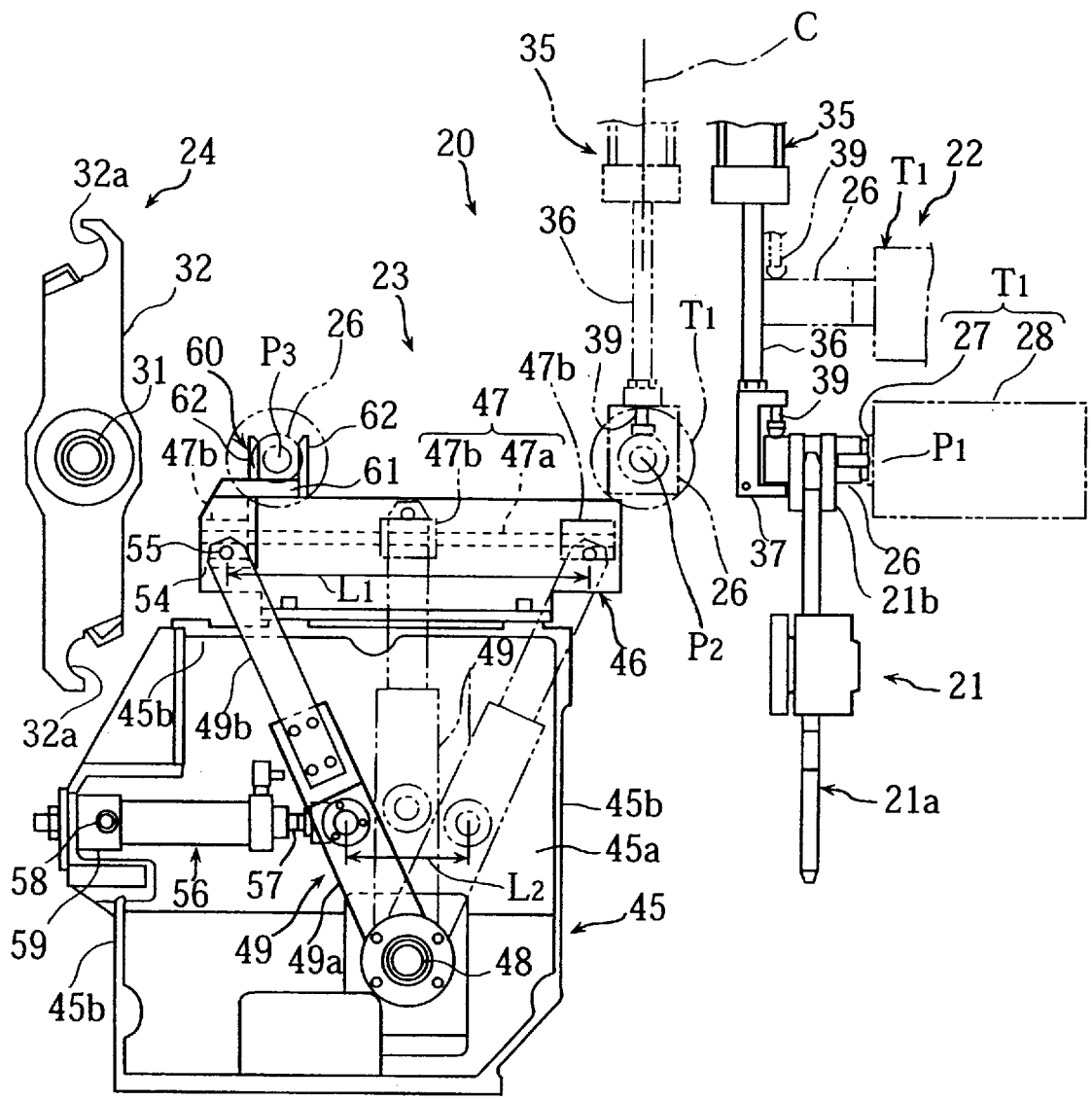
FIG. 5 is a right side view showing the overall construction of the tool changer and the rotation of the cylinder mechanism according to an embodiment of the present invention.
Figure 6:
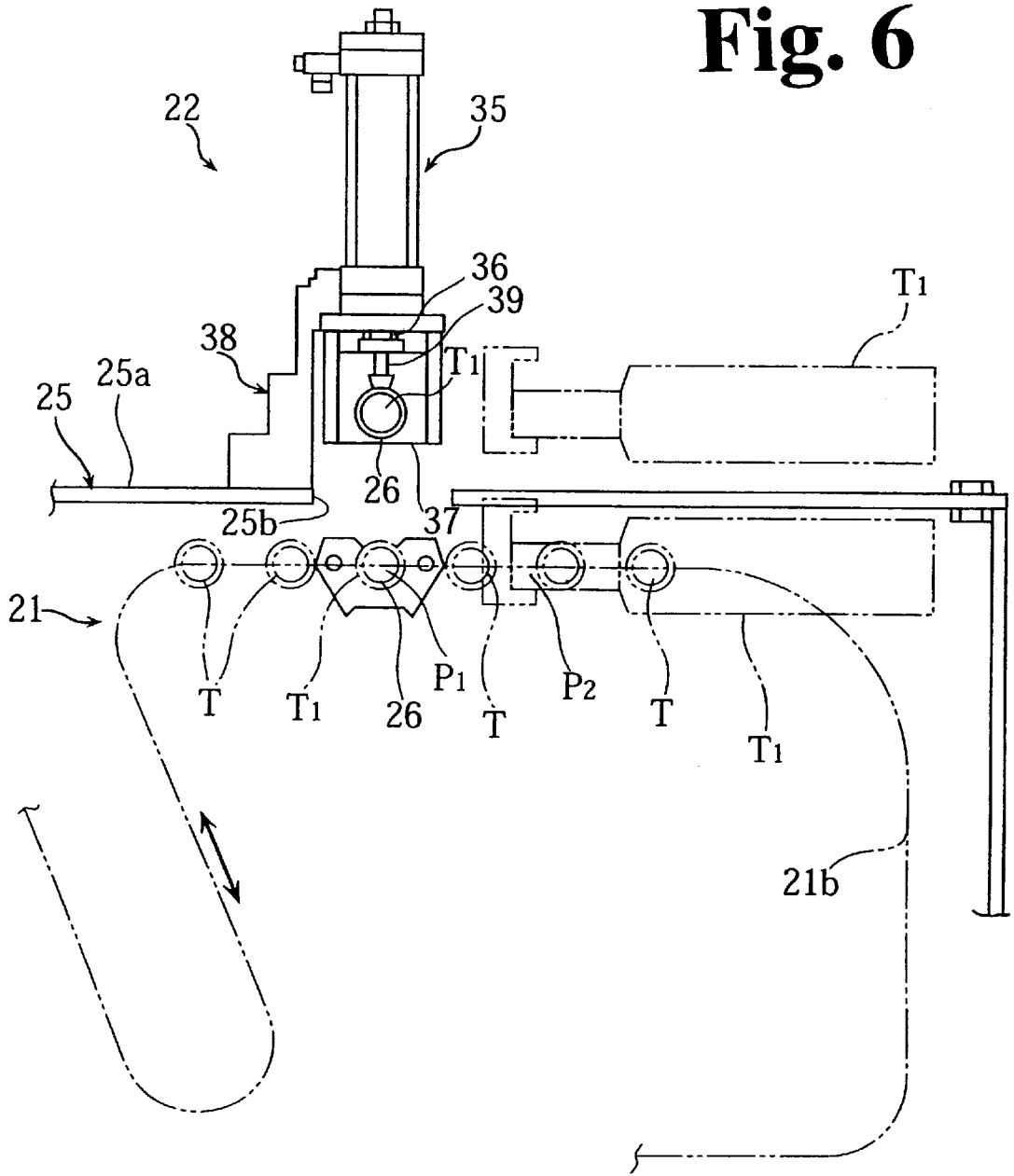
FIG. 6 is a schematic rear view of the turn and transfer mechanism of the tool changer according to an embodiment of the present invention.

The tools T are removably fitted to the individual tool transfer pots 26 of the tool magazine 21. Each tool T is placed so as to be positioned within a horizontal plane and toward a direction perpendicular to the axis of the headstock 7 (Z-axis direction). As seen in FIG. 5, the tool T has a cutting tool 28 fitted to a cylindrical-shaped tool holder 27 which is held by the tool transfer pot 26.

The tool changing mechanism 24 is constructed so that a changing shaft 31 is axially movable and rotatably supported by a support member 30 provided at a left end portion of the saddle 4 as viewed from the front. A changing arm 32 is fixed to a front end portion of the changing shaft 31. In this changing arm 32, cutouts 32a for holding the tool holder 27 are formed at both ends of a band-shaped plate. In the support member 30, a drive mechanism 30a is provided which drives the changing shaft 31 into rotation and into reciprocation in the axial direction.

Figure 4:
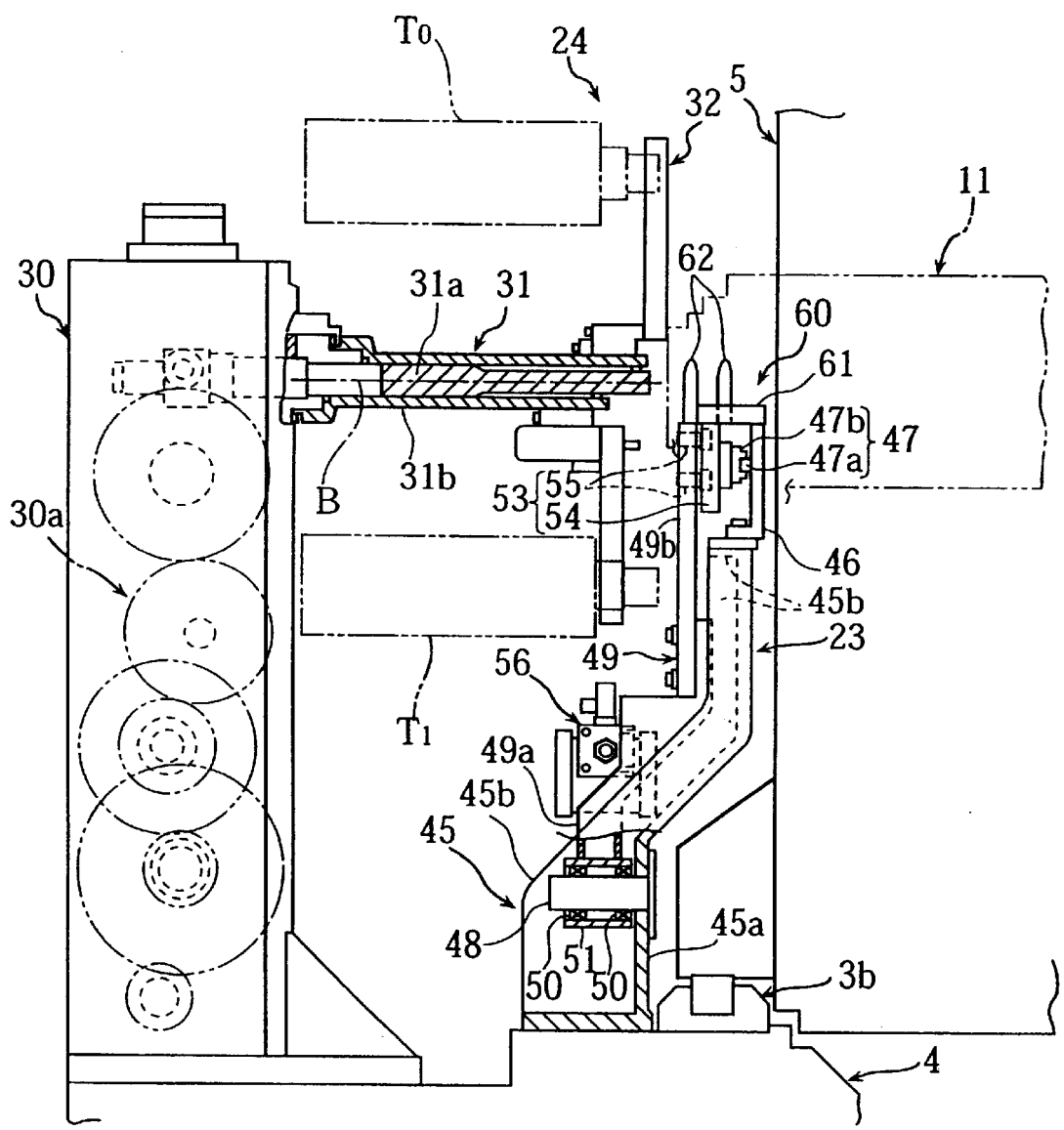
FIG. 4 is a front view of the tool changer according to an embodiment of the present invention.

The changing shaft 31 is constructed so that an axially moving cylinder 31b is integrally fitted to a rotating shaft 31a so as to be axially movable and rotatable therewith. The changing arm 32 is fixed to a front end portion of the axially moving cylinder 31b. As shown in FIG. 4, a portion of the changing shaft 31 above the axis B shows a state that the changing shaft 31 has moved forward so that a tool is fitted to the tool spindle 14. Further, the lower portion shows a state that the changing shaft 31 has moved backward so that a tool is pulled out from the tool spindle 14.

The tool turning/transferring mechanism 22 has the following structure. A takeout opening 25b is formed at a portion of an upper wall 25a of the magazine support base 25 adjacent to the tool takeout position P1. A piston rod 36 of a cylinder mechanism 35 is advanceably and retractably opposed to the takeout opening 25b. This cylinder mechanism 35 is rotatably held between a position adjacent to the tool takeout position P1 and a position rotated 90 degrees from the position about a turning axis C, by means of a bracket 38 mounted on the top of the upper wall 25a. The bracket 38 is provided with an unshown turn driving mechanism.

The piston rod 36 is equipped with a generally U-shaped gripping member 37 and a presser pin 39. The presser pin 39 is biased axially downward with an unshown spring. By pressing the upper part of the tool transfer pot 26 with the presser pin 39, the tool transfer pot 26 is gripped in cooperation with the gripping member 37.

When the piston rod 36 goes down, the gripping member 37 and the presser pin 39 move to a position where a tool transfer pot 26 of the next-process tool T1 is to be gripped. In this state, the tool transfer pot 26 is indexed to the tool takeout position P1. With the tool transfer pot 26 held by the gripping member 37 and the presser pin 39, the piston rod 36 goes up. At the upper end position of this upward movement, the cylinder member 35 turns 90 degrees about the turning axis C, and subsequently the piston rod 36 goes down. As a result, the next-process tool T1 is turned and transferred to the tool delivery position P2 so as to be parallel to the axis of the headstock 7.

The tool transfer mechanism 23 is constructed as follows. A transfer support base 45 is vertically provided and fixed between the column 5 on top of the saddle 4 and the changing arm 32.

This transfer support base 45 is formed into a generally box shape which extends upward while bending rightward as shown in FIG. 4. The transfer support base 45 has a side wall portion 45b integrally formed at a peripheral edge portion of its vertical wall portion 45a so that it is wide in the back-and-forth direction when viewed from the front. A guide plate 46 is fixedly bolted at an upper end portion of the vertical wall portion 45a. This guide plate 46 is formed into a band shape extending horizontally over a range from the tool delivery position P2 to the tool changing position P3. On the left side face of the guide plate 46, a rail 47a of a linear guide 47 is fixed and extends linearly between the two positions P2, P3, where a block 47b is slidably engaged with the rail 47a with balls (not shown) interposed between them.

A pivot shaft 48 is fixedly bolted at a lower end portion of the vertical wall portion 45a. A boss 51 fixed at the lower end of a transfer arm 49 is pivotably fitted to the pivot shaft 48 via a bearing 50. This transfer arm 49 is constructed so that a band-shaped upper half portion 49b is fixedly bolted to a generally rectangular-cylindrical lower half portion 49a. The upper end of the upper half portion 49b is fixed to the block 47b via a cam mechanism 53.

The cam mechanism 53 is constructed so that a cam plate 54 with a cam groove (not shown) formed therein is fixed to the block 47b. A cam follower 55 to be engaged with the cam groove of the cam plate 54 is attached to the upper half portion 49b. Pivotal motion of the transfer arm 49 is transformed into linear motion of the linear guide 47 by the cam mechanism 53.

Further, a piston rod 57 of an air cylinder 56 disposed with its axis directed along the back-and-forth and horizontal direction is coupled in proximity to the pivot shaft 48 of the transfer arm 49. The transfer arm 49 is pivotally driven between the delivery position P2 and the tool changing position P3 by the expansion and contraction of the piston rod 57. The air cylinder 56 is up-and-down swingably supported by a bracket 59 via a pivot shaft 58, and the bracket 59 is secured to the side wall portion 45b. The air cylinder 56 swings up and down on a fulcrum of this pivot shaft 58, thereby allowing the piston rod 57 to move linearly.

Figure 7:
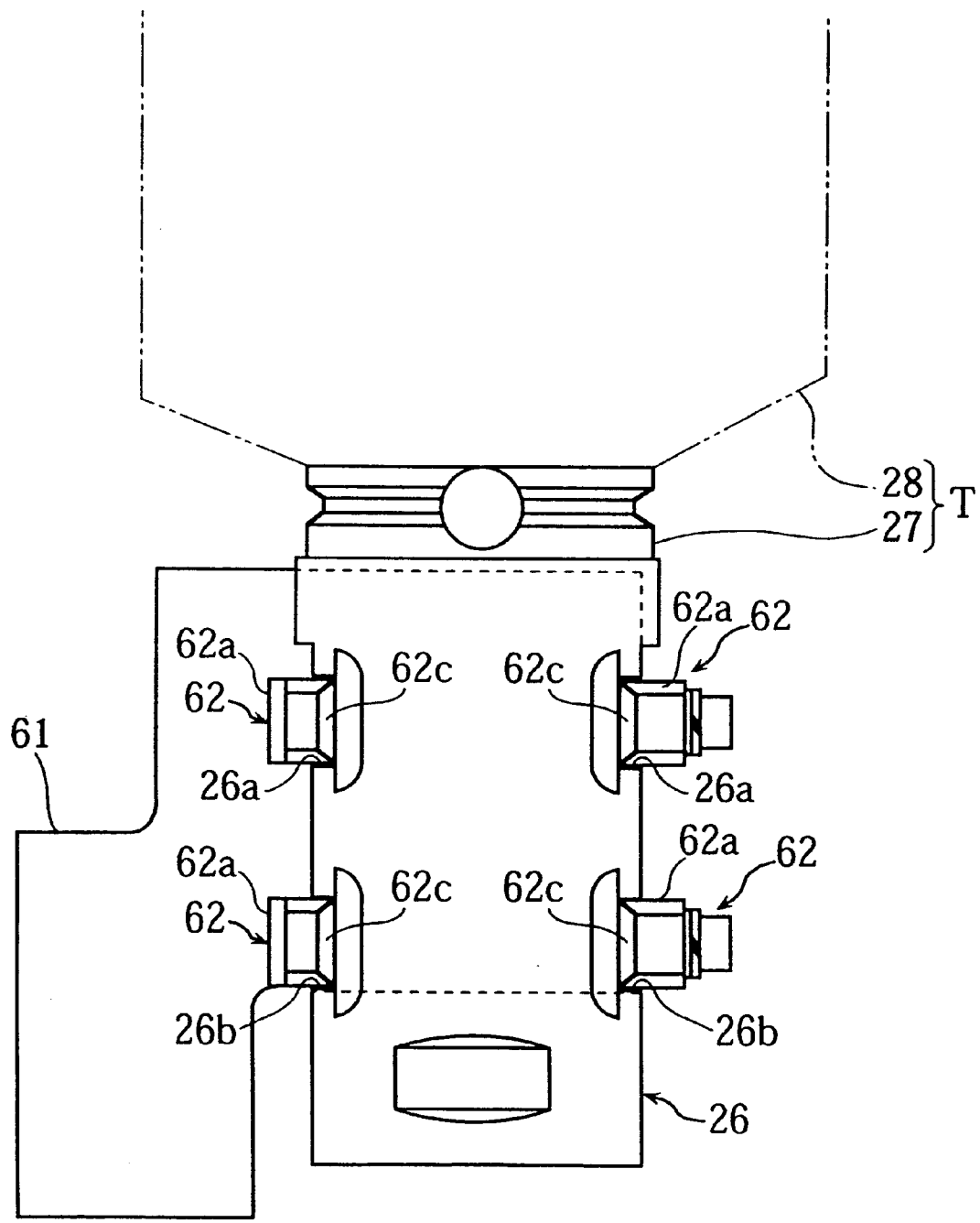
FIG. 7 is a plan view showing the positioning state of the tool transfer pot of the tool changer according to an embodiment of the present invention.
Figure 8:
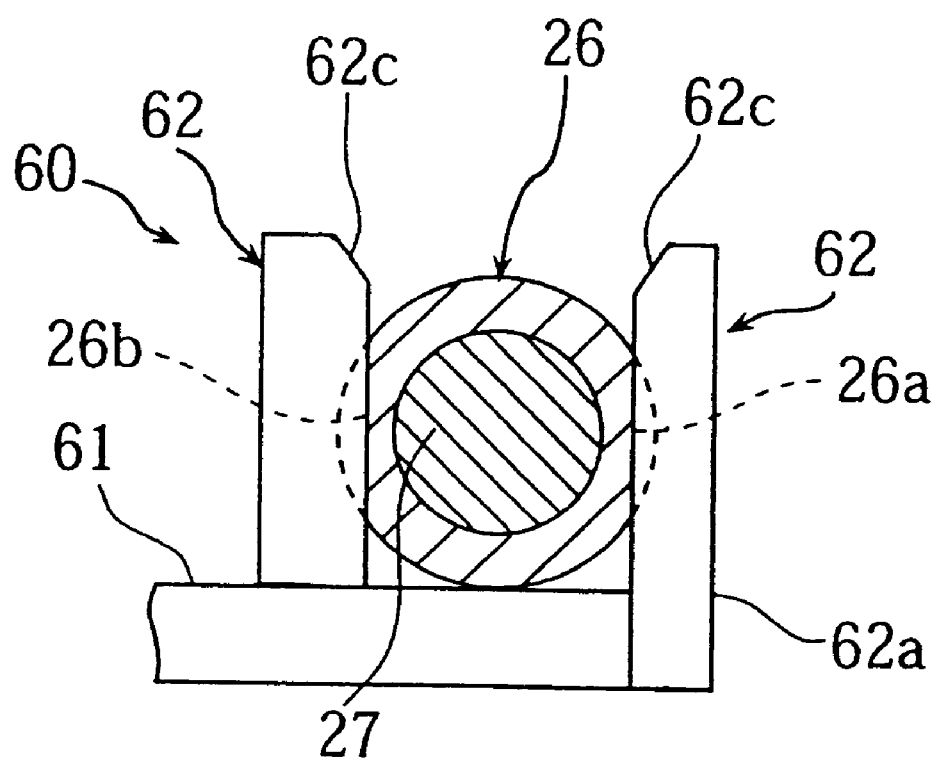
FIG. 8 is a cross sectional view showing the positioning state of the tool transfer pot according to an embodiment of the present invention.

A pot holding member (tool holding member) 60 is fixedly connected to an upper end portion of the block 47b. In FIGS. 7 and 8, this pot holding member 60 generally has a structure such that four guide pins 62 are implanted on a support plate 61. Each of these guide pins 62 is structured so that a sloping guide portion 62c is formed at an upper end portion of a prismatic pin body 62a.

One set of engaging grooves 26a, 26b are cut out at each of the front and rear places of the outer peripheral surface of each tool transfer pot 26 and the guide pin 62 is engaged with the engaging grooves 26a, 26b. In this way, the tool transfer pots 26, and therefore the tools T, are positioned and supported in the axial and circumferential directions.

Next, operation of the tool exchanger 20 of this embodiment is explained. When the process of turning or rotating the tool T loaded on the tool post body 11 has been completed, the rotational indexing device 10 turns the tool post body 11 through 90 degrees about the turning axis A. In this way, the process-completed tool T0 is indexed and positioned to the tool changing position that is parallel to the axis of the headstock 7.

During the machining process, the piston rod 36 of the cylinder mechanism 35 moves down so that the gripping member 37 and the presser pin 39 are positioned in the tool takeout position P1. When the tool magazine 21 transfers, indexes and positions a tool transfer pot 26, in which the next-process tool T1 is accommodated therein, to the tool takeout position P1, the gripping member 37 and the presser pin 39 grip the tool transfer pot 26. In this state the piston rod 36 goes up and then turns 90 degrees about the turning axis C. As a result, the next-process tool T1 is turned to a spindle-parallel position parallel to the headstock 7 and to the process-completed tool T0. In this state the piston rod 36 then goes down again. Then, the guide pins 62 of the pot holding member 60 are engaged with the engaging grooves 26a, 26b of the tool transfer pot 26, in which the next-process tool T1 is accommodated. In this way, the next-process tool T1 (tool transfer pot) is positioned and supported to the pot holding member 60 at the delivery position P2.

Subsequently, the piston rod 57 of the air cylinder 56 retreats, and the transfer arm 49 transfers the pot holding member 60 linearly from the delivery position P2 to the tool changing position P3. In this case, the relative motion of the front end of the transfer arm 49 with respect to the block 47b due to the pivoting of the transfer arm 49 is absorbed by the cam follower 55 and the cam groove, and the swing of the air cylinder 56 due to the pivoting of the transfer arm 49 is absorbed by the pivot shaft 58.

Then, the changing shaft 31 turns, and the changing arm 32 grips the process-completed tool T0 of the tool post body 11 and the next-process tool T1 in the tool changing position P3. In this state, the changing shaft 31 retreats, and pulls out the process-completed tool T0 from the tool spindle 14 and also pulls out the next-process tool T1 from the tool transfer pot 26. Subsequently, the changing arm 32 turns 180 degrees and advances. Then, the next-process tool T1 is gripped by the tool spindle 14, and the process-completed tool T0 is gripped by the tool transfer pot 26 supported by the pot holding member 60. This process-completed tool T0 is returned to a specified pot position of the tool magazine 21 via the tool transfer mechanism 23 and the tool turning/transferring mechanism 22.

According to this embodiment, the tool magazine 21 is disposed so that each tool T is directed perpendicular to the axis of the headstock 7. The next-process tool T1 is taken out from the tool takeout position P1 and turned and transferred to the tool delivery position P2 parallel to the process-completed tool T0 of the tool post body 11 in the spindle-parallel position by the tool turning/transferring mechanism 22. This tool turning/transferring mechanism 22 is comprised of the cylinder mechanism 35 and an unshown turning mechanism. Therefore, in the case where the tool magazine 21 in multi-tool specifications is mounted, the switch to the next-process tool T1 can be achieved with a simple structure. Thus, the tool changer for machine tools of this embodiment is applicable for use in flexible manufacturing systems for the production of many items in low volumes as well as for automatic continuous operation.

In this embodiment, since the tool magazine 21 is structured so that an endless transfer chain 21b is provided in the rear of the tool post 6 on the fixed bed 2 so as to run along the rear face of the machine, a large number of tools T, for example as many as 60 to 180 pieces, can be mounted without requiring much space. This allows for use in flexible manufacturing systems for the production of many items in low volumes as well as for automatic continuous operation.

Further, the tool takeout position P1 is in alignment with the delivery position P2 and the tool changing position P3. The next-process tool T1 in the tool takeout position P1 is taken out vertically upward in the unit of the tool transfer pot 26, turned 90 degrees at the upper end position and thereafter moved down, turned and transferred to the delivery position P2. Therefore, the next-process tool T1 can be transferred from the takeout position P1 to the delivery position P2 smoothly with less up-and-down and turning motions.

According to this embodiment, the transfer arm 49 is provided pivotable between the tool delivery position P2 and the tool changing position P3. The piston rod 57 of the air cylinder 56 is coupled in proximity to the pivot shaft 48 of the transfer arm 49. Moreover, the pot holding member 60 is coupled to the front end portion of the transfer arm 49. Therefore, as shown in FIG. 5, the length of stroke L2 of the piston rod 57 can be shortened relative to the amount of linear travel L1 of the pot holding member 60. In this way, the axial length of the air cylinder 56 can be shortened when compared to the conventional case where the air cylinder has a stroke equal to or more than the length of travel of the tool pot. Thus, proportionally to this reduction, the cost and installation space for the air cylinder 56 can be reduced.

Further, engaging grooves 26a, 26b extending in the tangential direction are cut out in the tool transfer pots 26 for holding the tool holder 27. The pot holding members 60 are provided with four guide pins 62 to be engaged with the engaging grooves 26a, 26b. Therefore, the next-process tool T1 can be positioned and supported with a simple structure and transferred to the tool changing position P3 in the positioned state. This allows for improved positioning accuracy during the tool change.

The above embodiment has been described for a case where tools T are placed in the tool magazine 21 so as to be directed perpendicular to the axis of the headstock 7, and the next-process tool T1 is turned and transferred to the delivery position P2 by the tool turning/transferring mechanism 22. However, the tool magazine of the present invention is not limited to this arrangement.

Figure 9:
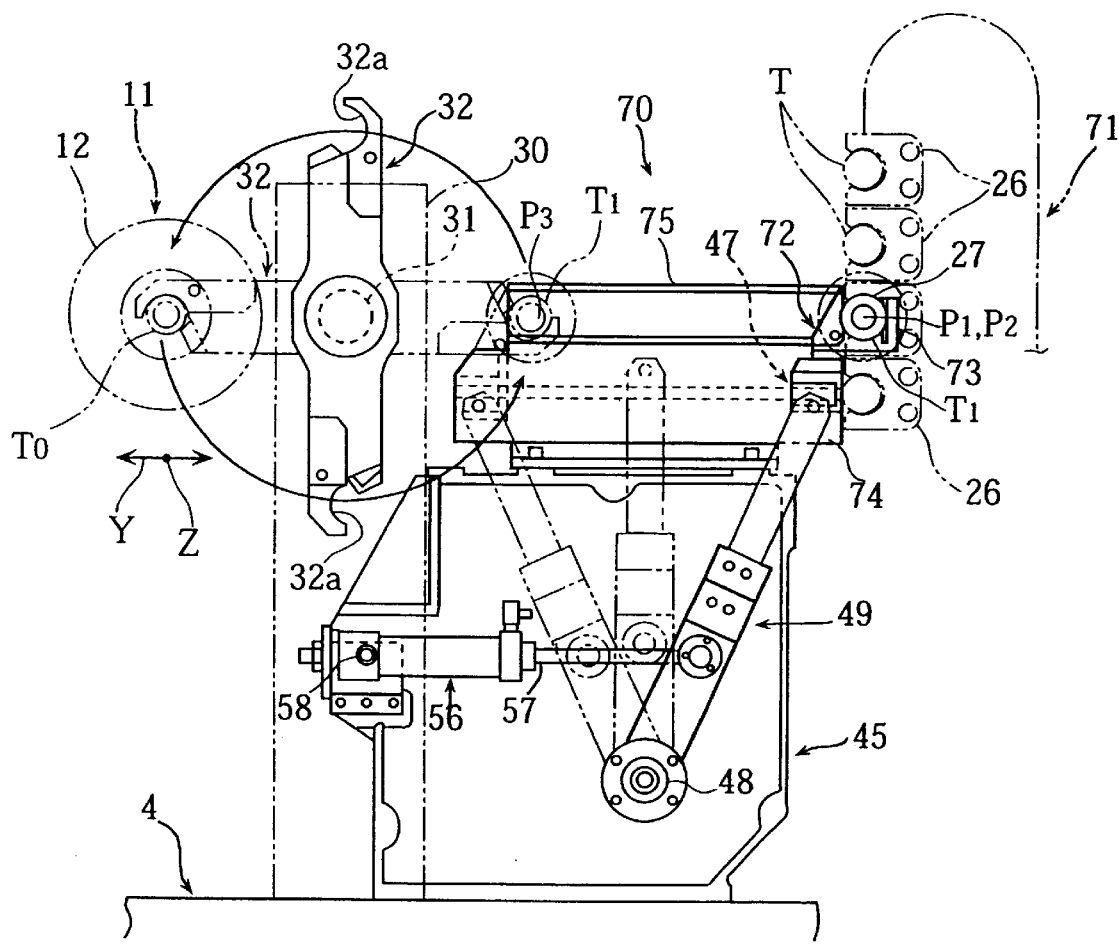
FIG. 9 is a side view showing a tool changer according to another embodiment of the present invention.

FIG. 9 shows a tool changer according to another embodiment of the invention where the same reference numerals as in FIG. 5 designate the same or corresponding component parts.

In this tool changer 70, a tool magazine 71 is provided in a longitudinally longer elliptical form. Tools T are set in the tool magazine 71 so as to be parallel to the tool spindle 14 positioned in the tool changing position, i.e., parallel to the process-completed tool T0. Therefore, the tool takeout position P1 in the tool magazine 71 is coincident with the delivery position P2.

The piston rod 57 of the air cylinder 56 is coupled to the transfer arm 49 forming part of the tool transfer mechanism in a proximity of the pivot shaft 48. A pot holding member 72 is coupled to an upper end portion of the transfer arm 49 via a cam mechanism. Further, a gripping member 73 for gripping the tool holder 27 is provided in the pot holding member 72. Also, a guide plate 74 is fixed to an upper wall of the transfer support base 45, and a U-shaped guide member 75 for guiding the pot holding member 72 in contact with its lower and upper faces is fixed to the guide plate 74.

According to this tool changer 70, since the air cylinder 56 is coupled to a proximity of the pivot shaft 48 of the transfer arm 49, the stroke length of the piston rod 57 can be made smaller than the travel distance of the pot holding member 72, so that the same effects as in the foregoing embodiment can be obtained. Also, since the tools T in the tool magazine 71 are placed so as to be directed parallel to the headstock, the aforementioned tool turning/transferring mechanism can be eliminated. Further, since the guide member 75 is provided to contact the lower and upper faces of the pot holding member 72, the pot holding member 72 can be transferred smoothly.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. The tool changer for machine tools comprising:
    a tool magazine having a multiplicity of tools, said tool magazine transferring and indexing a next-process tool to a predetermined tool takeout position;
    a tool transfer mechanism for taking out and transferring the next-process tool positioned in the tool takeout position to a tool changing position;
    a tool changing mechanism for changing a tool loaded on a tool post with the next-process tool positioned in the tool changing position; and
    a tool transfer pot for holding one of the tools, said transfer pot having an engaging groove extending in a linear direction,
    wherein said tool transfer mechanism comprises:
        a transfer arm pivotably disposed so as to have a front end portion of said transfer arm move between the tool takeout position and the tool changing position,
        a tool holding member coupled to said front end portion of said transfer arm, said tool holding member supporting the next-process tool and having a guide pin that engages with said engaging groove to thereby position and support the tool transfer pot in axial and circumferential directions; and
        a cylinder mechanism coupled to said transfer arm for driving said transfer arm.

2. The tool changer as claimed in claim 1, wherein said tool changing mechanism is rotationally mounted on a shaft so as to allow the tool loaded in the tool post and the next-process tool to be rotated 180 degrees.

3. The tool changer for machine tools comprising:
    a tool magazine having a multiplicity of tools, said tool magazine transferring and indexing a next-process tool to a predetermined tool takeout position;
    a turning/transfer mechanism for taking out and transferring the next-process tool positioned in the tool takeout position to a tool delivery position;
    a tool transfer mechanism for transferring the next-process tool positioned in the tool delivery position to a tool changing position;
    a tool changing mechanism for changing a tool loaded on a tool post with the next-process tool positioned in the tool changing position; and
    a tool transfer pot for holding one of the tools, said transfer pot having an engaging groove extending in a linear direction,
    wherein said tool transfer mechanism comprises:
        a transfer arm pivotably disposed so as to have a front end portion of said transfer arm move between the tool delivery position and the tool changing position,
        a tool holding member coupled to said front end portion of said transfer arm, said tool holding member supporting the next-process tool and having a guide pin that engages with said engaging groove to thereby position and support the tool transfer pot in axial and circumferential directions; and
        a cylinder mechanism coupled to said transfer arm for driving said transfer arm.

4. The tool changer as claimed in claim 3, wherein said tool changing mechanism is rotationally mounted on a shaft so as to allow the tool loaded in the tool post and the next-process tool to be rotated 180 degrees during movement of said tool changing mechanism.

5. The tool changer as claimed in claim 3, wherein said turning/transfer mechanism comprises a cylinder mechanism capable of reciprocal and rotational movement.

* * * * *